United States Patent
Koike (10) Patent No.: US 11,704,527 B2
(45) Date of Patent: *Jul. 18, 2023

(54) SHEET PROCESSING APPARATUS USING RADIO SIGNALS RECEIVED FROM WIRELESS TAGS

(71) Applicant: TOSHIBA TEC KABUSHIKI KAISHA, Tokyo (JP)

(72) Inventor: Yuki Koike, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,677

(22) Filed: May 24, 2022

(65) Prior Publication Data

US 2022/0283766 A1    Sep. 8, 2022

Related U.S. Application Data

(63) Continuation of application No. 17/114,462, filed on Dec. 7, 2020, now Pat. No. 11,385,849.

(30) Foreign Application Priority Data

Jan. 28, 2020   (JP) .................................. 2020-011480

(51) Int. Cl.
*G06K 19/07*     (2006.01)
*G06F 3/12*      (2006.01)
(Continued)

(52) U.S. Cl.
CPC ........... *G06K 19/0712* (2013.01); *B65H 7/20* (2013.01); *B65H 29/48* (2013.01); *B65H 43/00* (2013.01);
(Continued)

(58) Field of Classification Search
CPC ..... G06F 3/1292; G06F 3/1229; B65H 29/48; B65H 7/20; B65H 43/00; B65H 2553/52;
(Continued)

(56) References Cited

U.S. PATENT DOCUMENTS 7,905,403 B2      3/2011  Nagase
11,232,338 B2 *   1/2022  Tomiyama ......... G06K 19/0712
(Continued)

FOREIGN PATENT DOCUMENTS

JP    2006-290508 A    10/2006
WO    2005/102719 A1   11/2005

*Primary Examiner* — Barbara D Reinier
(74) *Attorney, Agent, or Firm* — Kim & Stewart LLP (57) ABSTRACT

A sheet processing apparatus for processing sheets each with a wireless tag, includes a roller, a wireless tag reader/writer, and a controller configured to control the roller to convey a first sheet with a first tag along a path, control the reader/writer to acquire first strengths of radio signals received from the first tag during the conveyance and second strengths of radio signals received from wireless tags of sheets not being conveyed, determine a threshold value of signal strength for distinguishing a wireless tag being conveyed from wireless tags not being conveyed based on the first and second strengths, and control the roller to convey a second sheet with a second tag and control the reader/writer to write to the second tag when a strength of a radio signal from the second tag is greater than or equal to the threshold value.

20 Claims, 9 Drawing Sheets

(51) Int. Cl.
    *B65H 43/00*     (2006.01)
    *B65H 29/48*     (2006.01)
    *H04N 1/32*     (2006.01)
    *B65H 7/20*     (2006.01)
    *H04N 1/00*     (2006.01)

(52) U.S. Cl.
    CPC .......... *G06F 3/1229* (2013.01); *G06F 3/1292* (2013.01); *H04N 1/32138* (2013.01); *B65H 2553/52* (2013.01); *B65H 2557/11* (2013.01); *H04N 1/00663* (2013.01)

(58) Field of Classification Search
    CPC ........ B65H 2557/11; B65H 2701/1244; G06K 19/0712; H04N 1/32138; H04N 1/00663
    USPC ................ 358/1.14, 1.15, 1.13, 1.1
    See application file for complete search history.

(56) References Cited

U.S. PATENT DOCUMENTS

| | | |
|---|---|---|
| 11,392,785 B2 * | 7/2022 | Tomiyama et al. ...... G06K 7/10 |
| 2007/0223014 A1 | 9/2007 | Lenkl |
| 2009/0051497 A1 | 2/2009 | Miyaso |
| 2009/0195828 A1 | 8/2009 | Urakawa |
| 2016/0277619 A1 | 9/2016 | Asai et al. |

\* cited by examiner

SHEET PROCESSING APPARATUS USING RADIO SIGNALS RECEIVED FROM WIRELESS TAGS

CROSS-REFERENCE TO RELATED APPLICATIONS

This application is a continuation of U.S. patent application Ser. No. 17/114,462, filed Dec. 7, 2022, which is based upon and claims the benefit of priority from Japanese Patent Application No. 2020-011480, filed on Jan. 28, 2020, the entire contents of which are incorporated herein by reference.

FIELD

Embodiments described herein relate generally to a sheet processing apparatus for processing sheets each with a wireless tag and a method for controlling a sheet processing apparatus configured to process sheets each with a wireless tag.

BACKGROUND

There is an image forming apparatus capable of forming an image on a sheet on which a wireless tag is provided. Such an image forming apparatus has a wireless tag communication device that writes information to the wireless tag and a sheet storage unit in which the sheet can be stored, such as a sheet feeding cassette and a manual feeding tray.

The wireless tag communication device may intend to write information to a wireless tag on a sheet that has been conveyed from the storage unit and is being conveyed for printing or other processing. However, due to the relatively close proximity of the wireless tag communication device to the storage unit (and the sheets therein), the wireless tag communication device may unintentionally write information to a wireless tag provided on a sheet still in the storage unit rather than one on a sheet being conveyed.

DETAILED DESCRIPTION

According to one embodiment, a sheet processing apparatus for processing sheets each with a wireless tag includes a roller through which a sheet is conveyed along a conveyance path, a wireless tag reader/writer configured to communicate with wireless tags, and a controller. The controller is configured to: control the roller to convey a first sheet with a first wireless tag along the conveyance path, control the reader/writer to acquire a first plurality of strengths of radio signals received from the first wireless tag during the conveyance of the first sheet and a second plurality of strengths of radio signals received from wireless tags of sheets not being conveyed by the roller, determine a threshold value of radio signal strength for distinguishing a wireless tag of a sheet being conveyed along the conveyance path from wireless tags of sheets not being conveyed along the conveyance path based on the first plurality of strengths and the second plurality of strengths, and control the roller to convey a second sheet with a second wireless tag and control the reader/writer to write to the second wireless tag when a strength of a radio signal received from the second wireless tag is greater than or equal to the threshold value.

In an image forming apparatus of one or more embodiments, it is possible to prevent erroneous writing of information to a wireless tag that is stored in or on the sheet storage unit and is on a sheet that is not being conveyed. Hereinafter, an image forming apparatus according to certain example embodiments will be described with reference to the drawings. In the following description, the same reference numerals are given to configurations having the same or substantially similar function. In addition, description of these overlapping configurational aspects may be omitted in some cases.

First, a side view of an image forming apparatus 10 according to an embodiment will be described with reference to FIG. 1.

Figure 1:
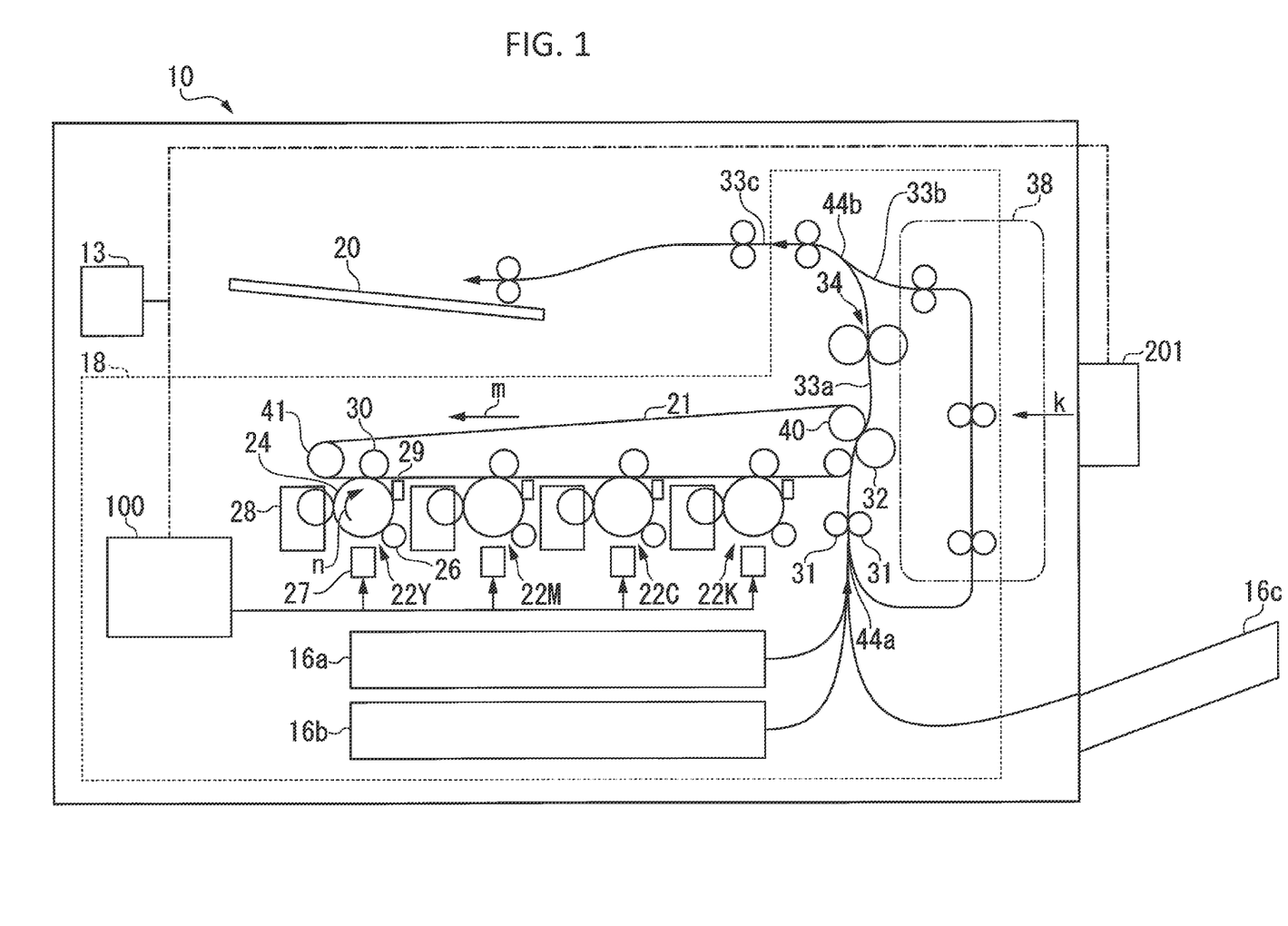
FIG. 1 is a side view of an image forming apparatus according to an embodiment.

In FIG. 1, the image forming apparatus 10 includes a control panel 13, a wireless tag communication device 201, and a printer unit 18. The printer unit 18 includes a controller 100, a sheet feeding cassette 16a, and a sheet feeding cassette 16b, a manual feed tray 16c, and the like. The controller 100 controls the control panel 13, the wireless tag communication device 201, and the printer unit 18. The controller 100 controls conveyance of a sheet in the printer unit 18. The control of the conveyance includes the control of a conveyance timing of the sheet, a stop position of the sheet, a conveyance speed of the sheet, and the like.

The control panel 13 includes an input key and a display unit. For example, the input key accepts an input by a user. For example, the display unit includes a touch panel. The display unit receives an input from a user and displays information corresponding to the input to the user. For example, the control panel 13 displays information related to settings for the image forming apparatus 10 so that the user is able to confirm and modify them. The control panel 13 notifies the controller 100 of the settings specified by the user.

The sheet feeding cassettes 16a and 16b can each store a sheet including a wireless tag or a sheet to which a wireless tag is attached. The sheet feeding cassettes 16a and 16b can also store a regular sheet not including a wireless tag. In the following description, unless otherwise specified, the sheet having a wireless tag is used. For example, the sheet is made of a material such as paper, plastic film, or the like.

The printer unit 18 performs an image forming operation. For example, the printer unit 18 forms an image on a sheet based on the image data. In the following description, forming an image on a sheet will also be referred to as printing. The printer unit 18 includes an intermediate transfer belt 21. The intermediate transfer belt 21 is supported by a driven roller 41, a backup roller 40, and the like in the printer unit 18. The printer unit 18 rotates the intermediate transfer belt 21 in the direction indicated by the arrow m.

The printer unit 18 includes four sets of image forming units 22Y, 22M, 22C, and 22K. The image forming units 22Y, 22M, 22C, and 22K are respectively used for image formation of different colors, Y (yellow), M (magenta), C (cyan), and K (black). The image forming units 22Y, 22M, 22C and 22K are arranged on a lower side of the intermediate transfer belt 21 along a rotation direction of the intermediate transfer belt 21.

Hereinafter, the image forming unit 22Y (yellow) among the image forming units 22Y, 22M, 22C, and 22K will be described as an example. The image forming units 22M, 22C and 22K each have the same configuration as that of the image forming unit 22Y, and description of image forming unit 22Y is therefore sufficient description of the other image forming units.

The image forming unit 22Y includes a photosensitive drum 24, a charging unit 26, an exposure scanning head 27, a developing device 28, a cleaner 29, and a primary transfer roller 30. The charging unit 26, the exposure scanning head 27, the developing device 28, and the cleaner 29 are disposed around the photosensitive drum 24 that rotates in the direction of the arrow n.

The primary transfer roller 30 faces the photosensitive drum 24 via the intermediate transfer belt 21.

The image forming unit 22Y electrostatically charges the photosensitive drum 24 using the charging unit 26 and selectively exposes the photosensitive drum 24 to light from the exposure scanning head 27, and thereby forms an electrostatic latent image on the photosensitive drum 24. The developing device 28 develops the electrostatic latent image on the photosensitive drum 24 by using a two-component developer formed by toner and carrier.

The primary transfer roller 30 transfers the toner image formed on the photosensitive drum 24 to the intermediate transfer belt 21 (hereinafter referred to as the "primary transfer"). Each of the image forming units 22Y, 22M, 22C and 22K forms a different color toner image on the intermediate transfer belt 21 by the corresponding primary transfer roller 30. The color toner images are formed by sequentially stacking toner images of Y (yellow), M (magenta), C (cyan), and K (black). The cleaner 29 removes the toner remaining on the photosensitive drum 24 after the primary transfer.

The printer unit 18 includes a secondary transfer roller 32. The secondary transfer roller 32 faces the backup roller via the intermediate transfer belt 21. The secondary transfer roller 32 transfers the color toner images on the intermediate transfer belt 21 to the sheet (hereinafter referred to as the "secondary transfer"). In the following description, the term "toner image" may refer to a color toner image or a single color toner image. The toner image may be a toner image using a decolorable toner.

A conveyance path 33a extends from a merging portion 44a to a branch portion 44b. A conveyance path 33b passes through the inside of a double-sided printer 38 and extends from the branch portion 44b to the merging portion 44a. A conveyance path 33c extends from the branch portion 44b to a sheet discharge tray 20.

The leading end of a sheet taken out from the sheet feeding cassette 16a, the sheet feeding cassette 16b, or the manual feed tray 16c abuts against a portion where two registration rollers 31 are in contact with each other. The inclination of the sheet is corrected when the leading end contacts the registration rollers 31. The controller 100 rotates the registration rollers 31 in accordance with the position of the toner image of the rotating intermediate transfer belt 21, and moves the sheet to the position of the secondary transfer roller 32. The controller 100 secondarily transfers the toner image formed on the intermediate transfer belt 21 to the sheet by the secondary transfer roller 32. The controller 100 causes the sheet to be conveyed along the conveyance path 33a, and control a fixing device 34 to fix the toner image to the sheet. The controller 100 causes the sheet on which the image has been formed to be conveyed along the conveyance path 33c and discharged to the sheet discharge tray 20.

In the case of double-sided printing, the controller 100 also causes the sheet on which the image has been formed on the front side to be conveyed along the conveyance path 33c. But after the entire sheet passes through the branch portion 44b, the controller 100 causes the sheet to be conveyed back along the conveyance path 33b (i.e., switch back). Then, the controller 100 causes the sheet to proceed to the merging portion 44a along the conveyance path in the double-sided printer 38, and then again conveyed along the conveyance path 33a via the registration roller 31. Then, the controller 100 controls the fixing device 34 to fix the toner image on the back surface of the sheet. The controller 100 causes the sheet on which the image has been formed on the back side to be conveyed along the conveyance path 33c and discharged to the sheet discharge tray 20.

The wireless tag communication device 201 includes a processor and a storage device. The wireless tag communication device 201 is capable of communicating with the controller 100. The wireless tag communication device 201 reads information from a wireless tag or writes information to the wireless tag by communicating with the wireless tag of the sheet. In one embodiment, the wireless tag is a radio frequency identifier (RFID) tag, and the wireless tag communication device 201 is an RFID tag reader/writer. As shown in FIG. 1, the wireless tag communication device 201 transmits radio waves in the arrow k direction. The wireless tag communication device 201 measures a received power strength of the radio wave transmitted from the wireless tag, and transmits the detected received power strength to the controller 100. In one embodiment, the power strength is represented by a received signal strength indicator (RSSI). In the following description, "RSSI of a wireless tag" indicates the RSSI of the radio wave transmitted from the wireless tag, and "RSSI of a sheet" indicates the RSSI of the radio wave transmitted from the wireless tag provided in/on the sheet.

In the printer unit 18, an electrostatic latent image is formed on the photosensitive drum 24 by the exposure scanning head 27 before the secondary transfer is performed by the secondary transfer roller 32. The electrostatic latent image formed on the photosensitive drum 24 is primarily transferred to the intermediate transfer belt 21 as a toner image. Further, by the secondary transfer roller 32, the toner image is secondarily transferred to a sheet that has been conveyed to the position of the registration roller 31.

Next, a functional block diagram of the image forming apparatus 10 according to an embodiment will be described with reference to FIG. 2.

Figure 2:
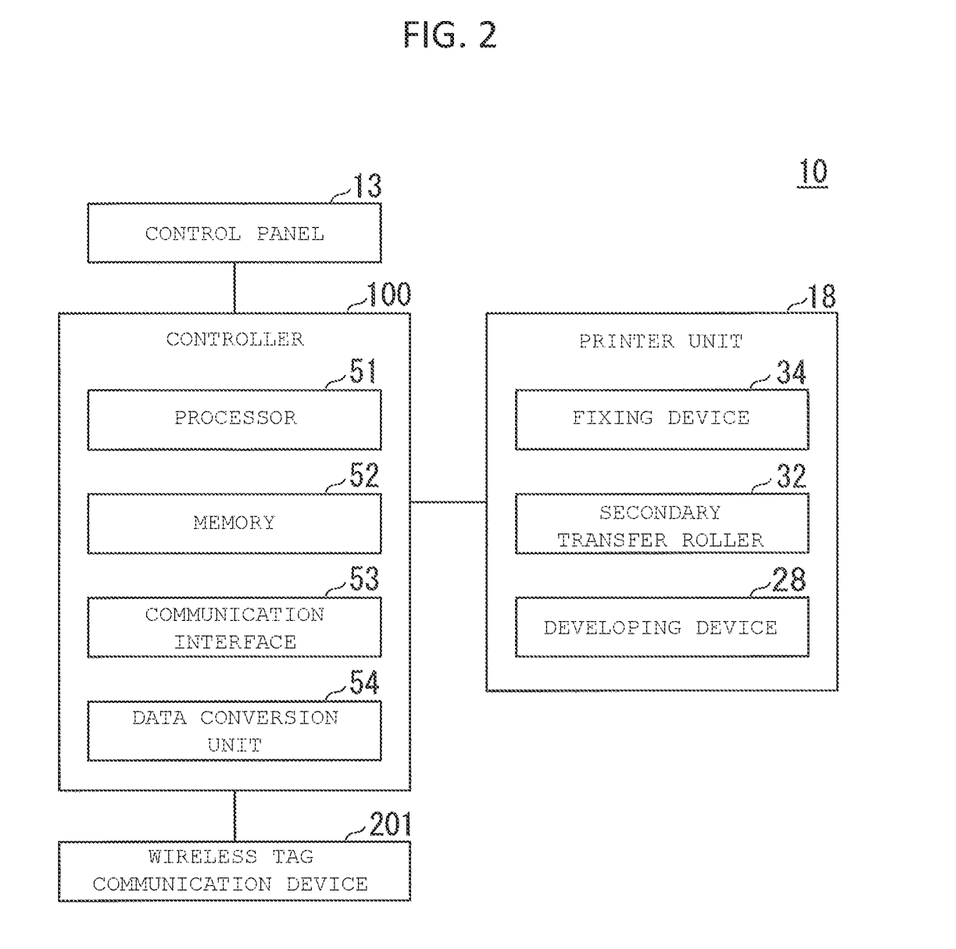
FIG. 2 is a functional block diagram of an image forming apparatus according to an embodiment.

In FIG. 2, the image forming apparatus 10 includes the controller 100, the control panel 13, the printer unit 18, and the wireless tag communication device 201.

The controller 100 includes a processor 51, a memory 52, a communication interface 53, and a data conversion unit 54. The processor 51 controls the control panel 13, the printer unit 18, and the wireless tag communication device 201 in accordance with an image processing program stored in the memory 52.

The processor 51 is, for example, a central processing unit (CPU), an application specific integrated circuit (ASIC), or the like. The memory 52 includes a read only memory (ROM), a random access memory (RAM), a hard disk drive (HDD), and/or a solid state drive (SSD). The communication interface 53 is an interface to receive print data (for example, data described in a page description language) indicating an image to be printed from a host such as a personal computer (PC). The received print data is stored in the memory 52. The image data conversion unit 54 determines a print condition based on the print data stored in the memory 52, and converts the print data into a printable data format (for example, raster data) that can be used by the printer unit 18, and stores the converted data in the memory 52.

The printer unit 18 includes the fixing device 34, the secondary transfer roller 32, and the developing device 28. The printer unit 18 forms an image on a sheet based on the data converted by the image data conversion unit 54.

Figure 3:
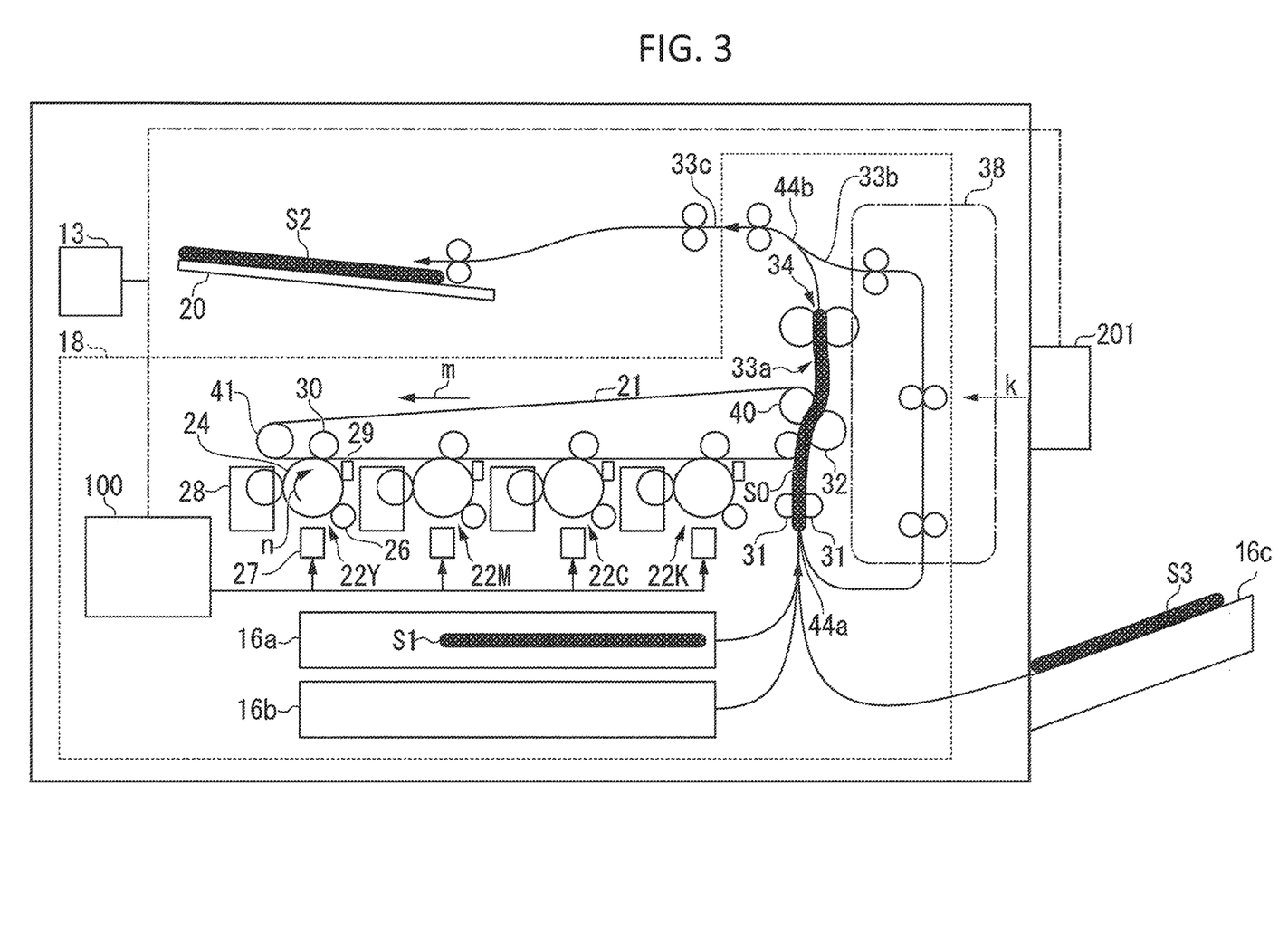
FIG. 3 is a diagram illustrating an example of a position where a sheet can be present in an image forming apparatus.

Next, a description will be given of a control for preventing erroneous writing of information to a non-target wireless tag other than a target wireless tag. FIG. 3 is a diagram illustrating various positions where a sheet can be present in the image forming apparatus 10. In FIG. 3, the sheet S1 is a sheet in the sheet feeding cassette 16a. The sheet S2 is a sheet on the sheet discharge tray 20. The sheet S3 is a sheet on the manual feed tray 16c. The sheet feeding cassettes 16a and 16b, the sheet discharging tray 20, and the manual feeding tray 16c are examples of the sheet storage unit.

The sheet SO is a sheet that is being conveyed through the conveyance path 33a. The sheets S0, S1, S2, and S3 have wireless tags T0, T1, T2, and T3, respectively.

In an embodiment, a sheet in which information is written to the wireless tag (hereinafter, also referred to as a "target sheet") is being conveyed along the conveyance path 33a.

In FIG. 3, the wireless tag communication device 201 transmits radio waves in the arrow k direction. Each wireless tag that has received the radio wave responds (returns radio waves) to the wireless tag communication device 201. The wireless tag communication device 201 receives radio waves from the wireless tags of each sheet. The RSSI of each wireless tag varies depending on the distance from the wireless tag communication device 201, the directionality of the radio wave, the interposition of device components between the tag, and the like.

In this example, the sheets S1, S2, and S3 are not presently being conveyed, whereas the sheet S0 is being conveyed. Therefore, while the sheet S0 is being conveyed, the RSSI of each of the immobile wireless tags T1, T2, and T3 does not change, but the RSSI of the wireless tag T0 changes.

In an embodiment, the timing for the writing of information to the wireless tag is controlled based on the RSSI detected when the target sheet is being conveyed. In the present disclosure, two non-limiting examples will be described for the control of the writing. In these examples, the controller 100 acquires a threshold of RSSI for distinguishing the wireless tag of a target sheet (a sheet being conveyed) from the other wireless tags of the sheets still stored in the sheet storage unit. When a RSSI of a wireless tag is within a range determined by the threshold, the controller 100 determines that the sheet with the wireless tag is being conveyed and controls the wireless tag communication device 201 to write information to the wireless tag. In the following description, the RSSI of the wireless tag TX (where X=0, 1, 2, or 3) may be expressed as R(X). For example, the RSSI of the wireless tag T0 is expressed as R(0).

First Embodiment

Figure 4:
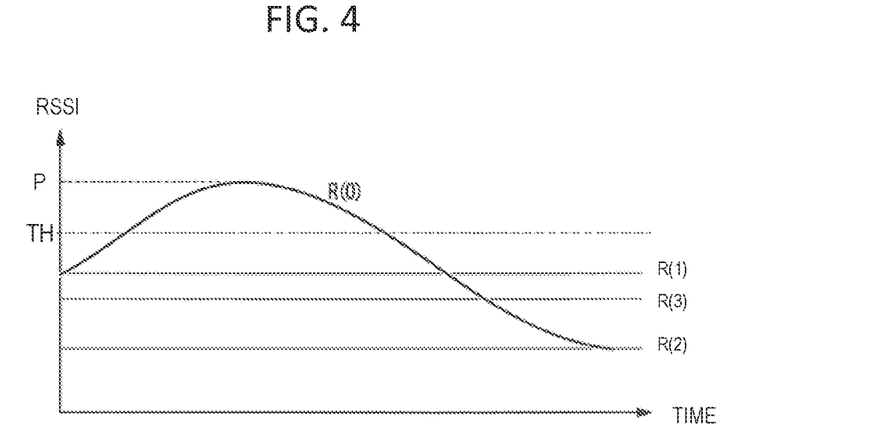
FIG. 4 is a diagram showing changes in signal strength from a wireless tag.

In a first embodiment, R(1), R(2), R(3), and R(0) are compared with each other. FIG. 4 is a diagram illustrating the values for R(0), R(1), R(2), and R(3) detected by the wireless tag communication device 201 while the target sheet is being conveyed. In the graph shown in FIG. 4, the horizontal axis represents time, and the vertical axis represents RSSI. The detection of the RSSI by the wireless tag communication device 201 is performed at a particular fixed interval or the like.

A sheet (S0) is conveyed from the sheet feeding cassette 16a and then ultimately discharged to the sheet discharge tray 20. Therefore, R(0) initially increases from the same value as R(1). R(0) reaches the maximum value (P) while being conveyed in the conveyance path 33a, and then gradually decreases. When the sheet is finally conveyed to the sheet discharge tray 20, R(0) has the same value as that of the R(2).

The controller 100 determines a threshold value TH of RSSI within a range [R(1), P]. That is, the threshold value is greater than the maximum RSSI of the sheets not being conveyed and equal to or less than the maximum value P. An example of the determination method will be described later. The threshold TH allows the controller 100 to distinguish between the wireless tag of a target sheet and the wireless tags of the other non-target sheets.

The controller 100 determines the threshold TH by conveying one sheet in advance. Then, the controller 100 causes another sheet to be conveyed, and when a detected RSSI value falls within a range defined by the threshold value during image formation, the controller 100 controls the wireless tag communication device 201 to write information to the wireless tag. In the example of FIG. 4, the "range determined by the threshold" is a range [TH, +∞], i.e., greater than or equal to the threshold TH. In actual control, the controller 100 controls the wireless tag communication device 201 to write information to a wireless tag when a detected RSSI is greater than or equal to the threshold TH for the wireless tag.

By starting the writing to the wireless tag at the time when the detected RSSI has just reached the threshold TH, it is possible to secure as much time as possible for completing the tag writing process, which suppresses the occurrence of an error, such as a write failure. Further, the efficiency of printing can also be improved by choosing a smaller threshold and increasing the conveyance speed of the sheet.

The range defined by the threshold TH described above includes any RSSI greater than or equal to the threshold TH. Further, the range does not include any RSSI detected from the wireless tags of sheets stored in the sheet storage unit. Thus, it is possible to prevent erroneous writing of information to the wireless tags other than the target wireless tag.

Figure 5:
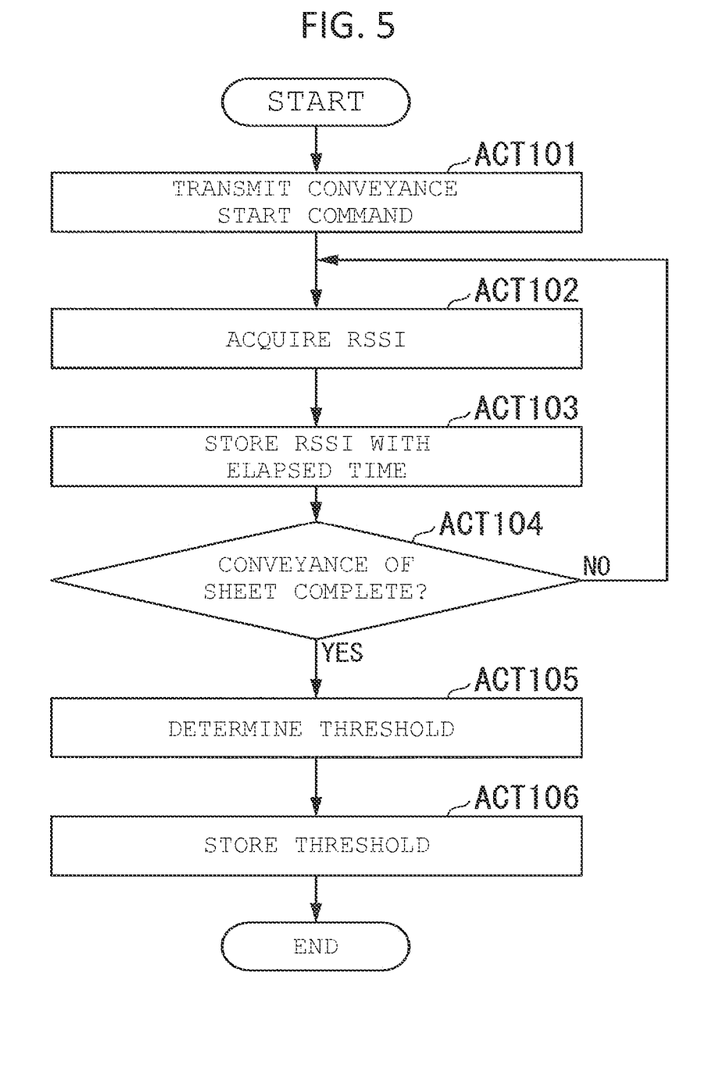
FIG. 5 is a flowchart of a threshold determination process performed by an image forming apparatus.

The above-described control will be described with reference to a flowchart. FIG. 5 is a flowchart of the threshold determination processing carried out by the controller 100. In order to convey a target sheet, the controller 100 transmits a conveyance start command to the printer unit 18 (ACT101). The controller 100 acquires RSSIs detected by the wireless tag communication device 201 via the communication interface 53 (ACT102). Here, the RSSIs R(0), R(1), R(2), and R(3) are obtained. The controller 100 associates the time elapsed after the transmission of the conveyance start command with the acquired RSSIs, and stores the acquired RSSIs in the memory 52.

The controller 100 determines whether the conveyance of the target sheet has been completed (ACT104). When the conveyance is completed, a message indicating that the conveyance has ended is transmitted from the printer unit 18 to the controller 100. The controller 100 can determine whether the conveyance of the target sheet has been completed depending on whether the message is received.

If the conveyance has not ended (ACT104: NO), the controller 100 continues to acquire the RSSIs in ACT102. If the conveyance is completed (ACT104: YES), the controller 100 determines a threshold (ACT105), stores the determined threshold in the memory 52 (ACT106), and ends the processing. As described above, ACT102 and ACT103 can be repeated until the sheet conveyance is completed. Therefore, a plurality of RSSIs R(0), R(1), R(2), and R(3) are acquired during a sheet conveyance. For example, the acquisition of the RSSIs is repeated for ten times, but the acquisition may be repeated for any number of times according to the variation of the RSSI.

A method for determining the threshold will be described. Here, the average values of a plurality of R(0), R(1), R(2), and R(3) values acquired are respectively referred to as AvR(0), AvR(1), AvR(2), and AvR(3). Once R(0), R(1), R(2), and R(3) have been repeatedly acquired, the controller 100 calculates each average value, AvR(0), AvR(1), AvR(2), and AvR(3). The controller 100 next determines max(AvR (1), AvR(2), and AvR(3)) and takes this maximum value as the maximum value M1 of which corresponds to the maximum RSSI of the wireless tags of the sheets still in a sheet storage unit. Additionally, the controller 100 determines a maximum value M2 of R(0) (M2=max (R(0)).

The controller 100 calculates an average value of the maximum values M1 and M2 (average value=(M1+M2)/2). The controller 100 sets this calculated average value as the threshold TH. The method of setting such a simple average value as the threshold TH can be performed with a relatively small processing load. In another calculation method, expected variations in RSSI due to the individual characteristics of a wireless tag or the like can be considered in calculating the threshold TH.

The method for determining the threshold is not limited to the method described above, and, in general, any determination method may be employed as long as the method enables the controller 100 to distinguish between the wireless tag of the target sheet and the wireless tags of the other non-target sheets.

Figure 6:
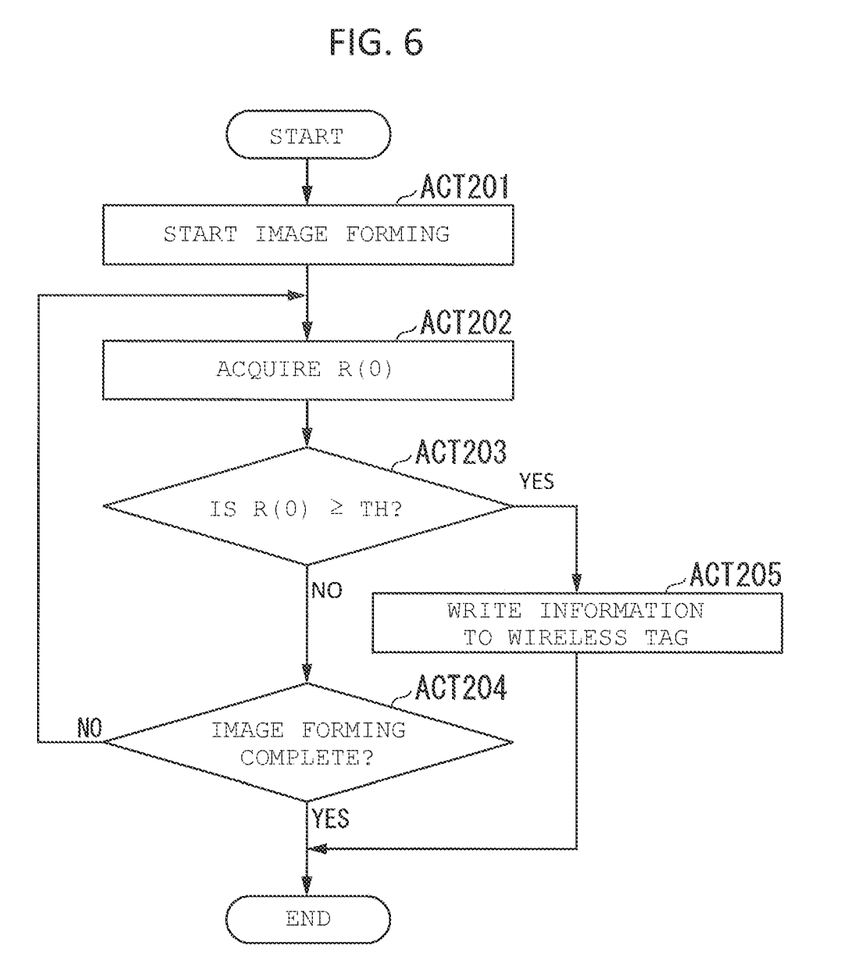
FIG. 6 is a flowchart of an image forming wireless tag control process performed by an image forming apparatus during image formation.

The determined threshold TH is used during printing. FIG. 6 is a flowchart of the wireless tag control processing during image formation carried out by the controller 100. In order to start image formation, the controller 100 transmits an image forming start command to the printer unit 18 (ACT201). The controller 100 acquires the RSSI of a wireless tag (e.g., R(0)) as detected by the wireless tag communication device 201 through the communication interface 53 (ACT202).

The controller 100 determines whether R(0) is greater than or equal to the threshold TH (that is, is R(0) threshold TH satisfied?) that has been determined by the method shown in FIG. 5 (ACT203). Therefore, in ACT203, it is determined whether R(0)≥ threshold TH has been satisfied. If R(0) is the threshold TH or more (ACT203: YES), the controller 100 writes information (ACT205) into the wireless tag corresponding to R(0) that has been detected, and ends the processing.

If R(0) is not within the appropriate range(ACT203: NO), the controller 100 next identifies whether the image formation process has been completed (ACT204). When the image formation has been completed, a message indicating that the image formation has been completed is transmitted from the printer unit 18 to the controller 100. The controller 100 can determine whether the image forming has been completed based on whether the message has been received.

If the image formation has not been completed (ACT204: NO), the controller 100 acquires R(0) again in ACT202. When the image formation is completed (ACT204: YES), the controller 100 ends the processing.

In the above-described wireless tag control processing during image forming, information is written to a wireless tag only when an RSSI greater than or equal to the threshold TH is detected, and thus it is possible to prevent erroneous writing of the information to a non-target wireless tag.

In the graph illustrated in FIG. 4, the maximum value of R(0) is greater than any other values of R(1), R(2), and R(3). However, the present disclosure can be applied to a case where the maximum value of R(0) is less than some of the values of R(1), R(2), or R(3) at various points. Specifically, description of this case will be made with reference to FIG. 7.

Figure 7:
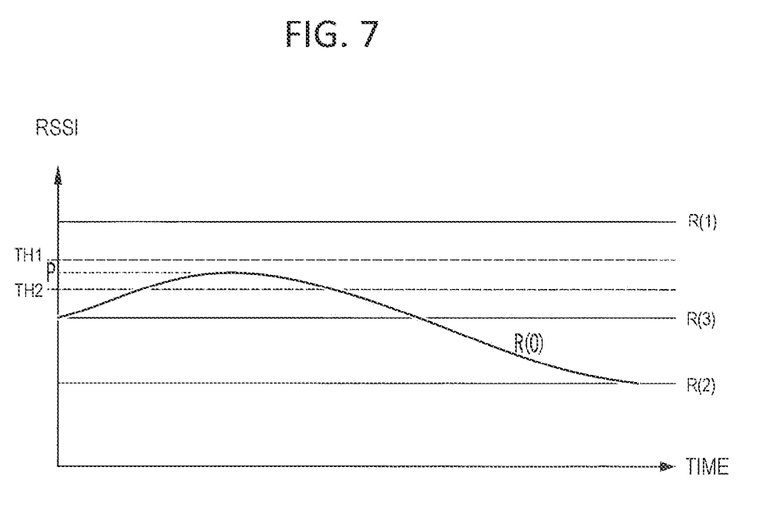
FIG. 7 is a diagram showing changes in signal strength from a wireless tag.

FIG. 7 is a diagram illustrating R(0), R(1), R(2) and R(3) as detected by the wireless tag communication device 201 when a sheet is conveyed. In FIG. 7, it is assumed that the sheet is conveyed from the manual feed tray 16c and then discharged to the sheet discharge tray 20. In this example, R(0) increases from the same value as R(3), then reaches the maximum value (P) while the sheet is being conveyed along the conveyance path 33a, and then begins to decrease. When the sheet has been finally conveyed to the sheet discharge tray 20, then R(0) has the same value as that of the R(2).

Thus, in this example, R(0) does not ever exceed the value of R(1)and only exceeds the value of R(3) for a portion of the conveyance time. To account for this, the controller 100 calculates two thresholds TH1 and TH2. Here, TH1 is P+a, and TH2 is P−b, where a and b are positive and are values satisfying P+a<R(1) and P−b>R(3).

The controller 100 calculates the thresholds TH1 and TH2 by conveying one target sheet as a test sheet beforehand or the like. Then, the controller 100 controls the wireless tag communication device 201 to write information to the wireless tag when the acquired RSSI falls within the range defined by the thresholds TH1 and TH2. In the example of FIG. 7, the "range determined by the thresholds" is range [TH2, TH1], that is, greater than or equal to the threshold TH2 and less than or equal to the threshold TH1. In actual control, the controller 100 controls the wireless tag communication device 201 to write information to a wireless tag when an RSSI greater than or equal to the threshold TH2 and less than or equal to the threshold TH1 is detected from the wireless tag.

By starting the writing to the target wireless tag at the timing when the detected RSSI falls within the range [TH2, TH1], it is possible to secure as much time as possible for completing the writing, which suppresses the occurrence of an error, such as a write failure. Further, the efficiency of printing can also be improved by choosing smaller thresholds and increasing the conveyance speed of the sheet.

As described above, in the first embodiment, by comparing signal strengths from wireless tags R(1), R(2), R(3) and R(0) at various positions in the image forming apparatus 10, it is possible to prevent information from being erroneously written to non-target wireless tags.

Second Embodiment

In a second embodiment, a plurality of sheets are conveyed to determine a threshold based on RSSIs received from the wireless tag provided in each of the sheets being conveyed. Specifically, R(0) is acquired from each sheet being conveyed to determine the threshold. In the following description, for illustration purpose, an example in which two sheets are conveyed will be described.

Figure 8:
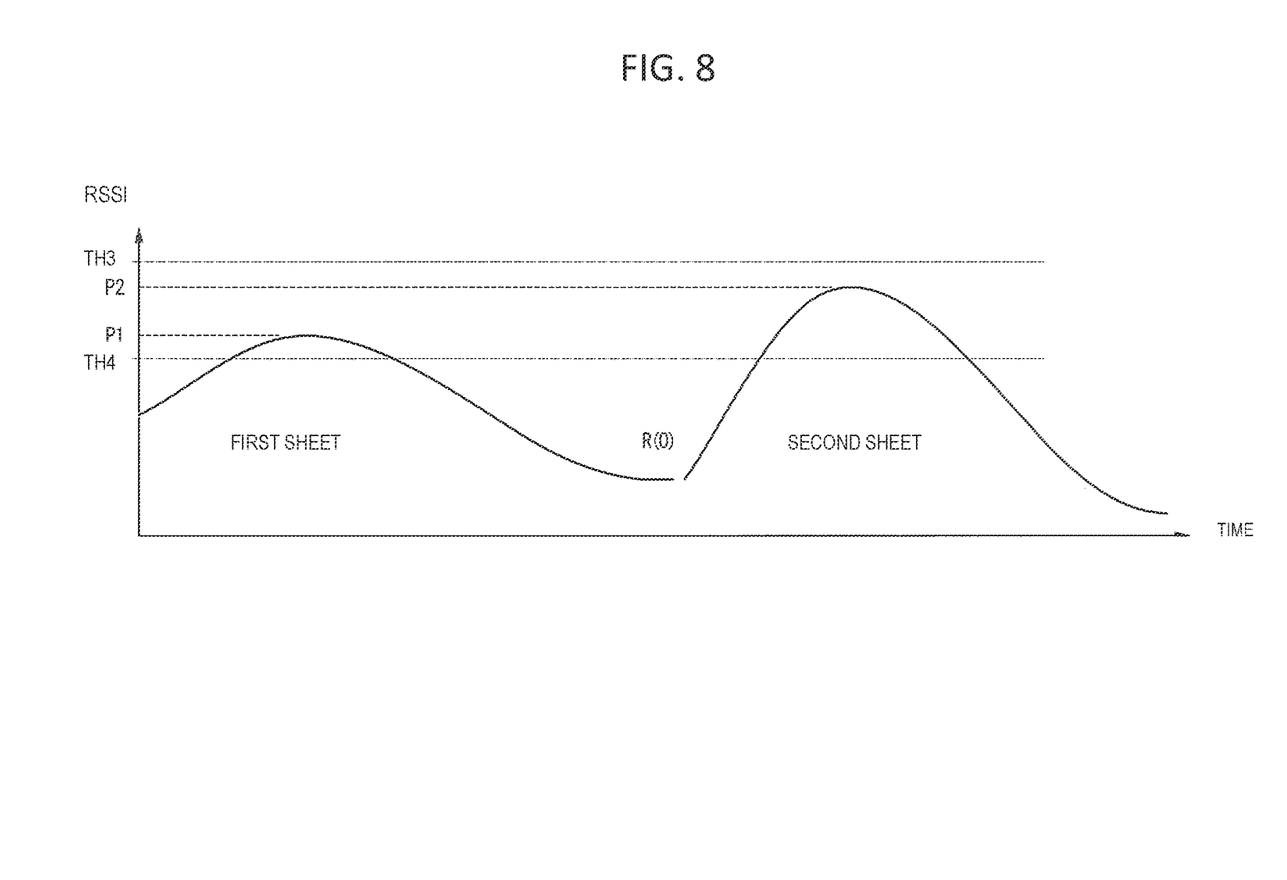
FIG. 8 is a diagram illustrating changes in signal strength from two wireless tags.

FIG. 8 is a diagram illustrating two R(0) detected by the wireless tag communication device 201 when two sheets are conveyed in sequence. In the graph shown in FIG. 8, the horizontal axis represents time, and the vertical axis represents RSSI. The detection of the RSSI by the wireless tag communication device 201 is performed at a particular interval or the like.

As shown in FIG. 8, it is assumed that the maximum value of the RSSIs of the first sheet is P1, and the maximum value of the RSSIs of the second sheet is P2 (where, in this example, P2>P1). The controller 100 determines two thresholds TH3 and TH4, where TH3 is P2 30 c, and TH4 is P1−d, where c and d are positive and are values for accounting for variations of the RSSI sheet to sheet (or more particularly wireless tag to wireless tag). In the example, the values of c and d are determined in advance based on, for example, the known characteristics of the wireless tag, the obtained statistics of the variation in the RSSI, and the like.

Similar to that described above, the controller 100 determines the thresholds TH3 and TH4 from the maximum values of RSSIs detected from the respective two sheets conveyed in sequence. Then, the controller 100 controls the wireless tag communication device 201 to write information to a wireless tag when the detected RSSI falls within the range defined by the thresholds TH3 and TH4. In the example of FIG. 8, the "range determined by the threshold" is a range [TH4, TH3], i.e., greater than or equal to the threshold TH4 and less than or equal to the threshold TH3. In the actual control, the controller 100 controls the wireless tag communication device 201 to write information to a wireless tag when an RSSI (R(0)) is greater than or equal to the threshold TH4 and less than or equal to the threshold TH3 is detected from the wireless tag.

The range defined by the thresholds TH3 and TH4 includes the maximum values of the received power strengths received from the wireless tags provided in a plurality of sheets being conveyed. Thus, it is possible to prevent erroneous writing of information to non-target wireless tags other than the target wireless tag.

Figure 9:
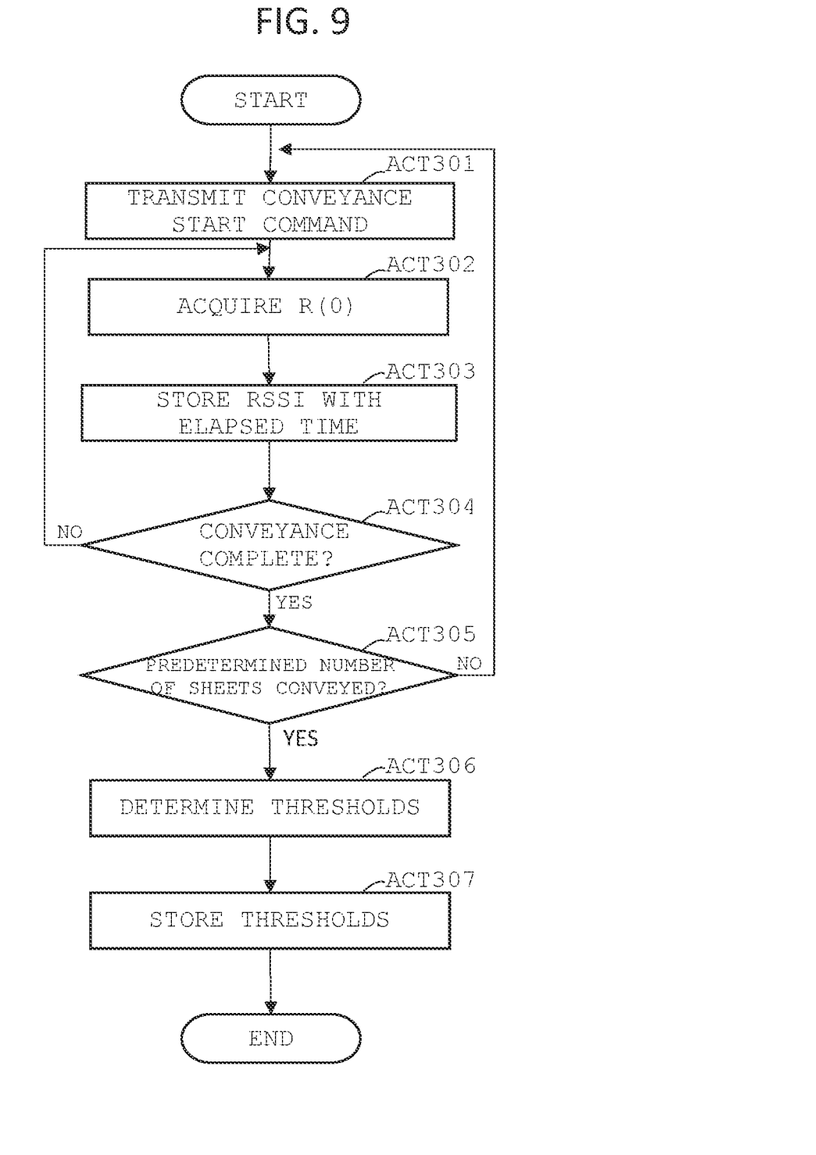
FIG. 9 is a flowchart of a threshold determination process performed by an image forming apparatus.

FIG. 9 is a flowchart of the threshold determination processing carried out by the controller 100. In order to convey the target sheet, the controller 100 transmits a conveyance start command to the printer unit 18 (ACT301). The controller 100 receives the RSSI (R(0)) detected by the wireless tag communication device 201 through the communication interface 53 (ACT302). The controller 100 stores the time elapsed after the transmission of the conveyance start command and the acquired R(0) in the memory 52 in association with each other.

The controller 100 determines whether the conveyance of the target sheet has been completed (ACT304). When the conveyance has been completed, a message indicating that the conveyance has ended is transmitted from the printer unit 18 to the controller 100. The controller 100 can determine whether the conveyance of the target sheet has been completed depending on whether the message has been received.

If the conveyance has not ended (ACT304: NO), the controller 100 acquires the RSSI again in ACT302. When the conveyance has been completed (ACT304: YES), the controller 100 determines whether conveyance of a predetermined number of sheets has been completed (ACT305). The predetermined number of sheets is, for example, two sheets; however, the number of sheets used in this process is not particularly limited, and, in general, the accuracy of the threshold improves with a greater number of sheets.

If the conveyance of the predetermined number of sheets has not been completed (ACT305: NO), the controller 100 transmits a conveyance start command to the printer unit 18 again in order to convey another target sheet (ACT301). When the conveyance of the predetermined number of sheets has been completed (ACT305: YES), the controller 100 determines the thresholds TH3 and TH4 (ACT306), stores the determined thresholds in the memory 52 (ACT307), and ends the process. As described, ACT302 can be repeated until a target sheet conveyance is completed. Therefore, a plurality of R(0) values can be acquired for each target sheet during the conveyance process. In an embodiment, the number of acquisitions of the RSSI value is about 10 during the transit of a target sheet through the image forming apparatus 10, but the number of acquisitions may be appropriately determined according to the expected variation of the RSSI or the like. Also, the number of sheets may be appropriately predetermined in accordance with the variation of the RSSI or the like.

The thresholds stored in the above-described threshold determination processing are subsequently used in image formation processing. The wireless tag control processing during image formation is performed according to the processing shown in FIG. 6. In the case of the thresholds shown in FIG. 8, the range of the ACT203 in FIG. 6 would be range [TH4, TH3], that is, greater than or equal to the threshold TH4 and less than or equal to the threshold TH3.

As described above, in the second embodiment, it is possible to prevent erroneous writing of information to a non-target wireless tag by using thresholds determined in advance based on conveyance of a plurality of sheets.

In the first and second embodiments, the magnitude of the output of the radio wave transmitted to the wireless tag by the wireless tag communication device 201 may be changed. The change in the magnitude of the output is effective, for example, in a case where the threshold cannot be determined, or in a case where the threshold can be determined but the "range determined by the threshold" is too narrow to be practical, for example. When the magnitude of the output is changeable, the controller 100 may determine the threshold by increasing or decreasing the output. This makes it possible to improve the accuracy of the threshold, and thus it is possible to prevent erroneous writing of information to non-target wireless tags other than the target wireless tag.

In the first embodiment and the second embodiment, the controller 100 performs the determination of the threshold and the instruction for writing the information to the wireless tag, but the present disclosure is not limited to this. For example, the wireless tag communication device 201 and a PC (Personal Computer) may be allowed to communicate with each other, and the controller 100 and the PC can also communicate with each other. The PC may thus perform the determination of the threshold(s) and provide the instruction(s) for writing the information to the wireless tag(s), and the controller 100 may more particularly perform control related to conveyance of the sheet or the like. As such, as compared to a case where the processing is performed only by the controller 100, the processing load may be distributed, and generally, the PC has more computing resources. Therefore, it is possible to improve the accuracy of the threshold evaluation by permitting a PC to perform statistical processing and fine control of wireless tag writing processing, and thus it is possible to additionally prevent erroneous writing of information to a wireless tag other than the target wireless tag.

The aforementioned embodiments prevent erroneous writing of information to the non-target wireless tag by using the fact that the RSSI received from the wireless tag provided in a sheet being conveyed through an image forming apparatus changes. Accordingly, it is not necessary to provide a special conveyance path for a sheet with a wireless tag to be written, and therefore, extra manufacturing cost and product cost are not incurred. Furthermore, since it is not necessary to provide a special conveyance path, it is possible to install the wireless tag communication device in a general purpose image forming apparatus and update firmware or the like of the image forming apparatus to handle wireless tag writing operations. Therefore, it is possible to realize the present embodiments at a very low cost without much additional effort beyond that already associated with the fabrication of an image forming apparatus.

The functions of the image forming apparatus according to the above-described embodiments may be realized by a computer. In such a case, one or more programs for performing the functions may be recorded in a non-transitory computer-readable recording medium, and the programs recorded in the recording medium may be loaded into the computer system and executed by the computer system. The "computer system" in this context may include an operation system (OS) and hardware such as a peripheral device. A "computer-readable recording medium" refers to a portable medium such as a flexible disk, a magneto-optical disk, a ROM, or a CD-ROM, and a storage device such as a hard disk in the computer system. Furthermore, the "computer-readable recording medium" may be any medium for holding a program, and may be accessed by a communication line and the program may be transmitted via a network such as the Internet or a communication line such as a telephone line. A program may be downloaded, or otherwise transmitted, from a server or another computer. Such server or other computer may be a cloud-based computer or the like. The programs may perform a part of the functions described above, or may perform the above-described functions in combination with other programs already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. A sheet processing apparatus for processing sheets each with a wireless tag, comprising:
    a roller through which a sheet is conveyed along a conveyance path;
    a wireless tag reader/writer configured to communicate with wireless tags; and
    a controller configured to:
        control the roller to convey a first sheet with a first wireless tag along the conveyance path,
        control the reader/writer to acquire a first plurality of strengths of radio signals received from the first wireless tag during the conveyance of the first sheet and a second plurality of strengths of radio signals received from wireless tags of sheets not being conveyed by the roller,
        determine a threshold value of radio signal strength for distinguishing a wireless tag of a sheet being conveyed along the conveyance path from wireless tags of sheets not being conveyed along the conveyance path based on the first plurality of strengths and the second plurality of strengths, and
        control the roller to convey a second sheet with a second wireless tag and control the reader/writer to write to the second wireless tag when a strength of a radio signal received from the second wireless tag is greater than or equal to the threshold value.

2. The sheet processing apparatus according to claim 1, wherein the threshold value is greater than each of the second plurality of strengths.

3. The sheet processing apparatus according to claim 1, wherein
    the controller is further configured to, after completion of the conveyance of the first sheet:
        control the roller to convey a third sheet with a third wireless tag, and
        acquire a third plurality of strengths of radio signals received from the third wireless tag during the conveyance of the third sheet, and
        the threshold value is determined further based on the third plurality of strengths.

4. The sheet processing apparatus according to claim 1, further comprising:
    a paper storage cassette in which the sheets not being conveyed by the roller can be stored.

5. The sheet processing apparatus according to claim 1, further comprising:
    a manual sheet feed tray in which the sheets not being conveyed by the roller can be stored.

6. The sheet processing apparatus according to claim 1, further comprising:
    a plurality of paper storage cassettes in which the sheets not being conveyed by the roller can be stored.

7. The sheet processing apparatus according to claim 1, wherein the reader/writer acquires, as the first plurality of strengths and the second plurality of strengths, received signal strength indicators (RSSIs).

8. The sheet processing apparatus according to claim 1, wherein a wireless tag of each sheet is a radio frequency identification (RFID) tag.

9. The sheet processing apparatus according to claim 1, further comprising:
    a printer configured to form an image on the second sheet conveyed by the roller.

10. The sheet processing apparatus according to claim 9, wherein the sheet processing apparatus is an image forming apparatus.

11. A method for controlling a sheet processing apparatus configured to process sheets each with a wireless tag, the method comprising:
    conveying a first sheet with a first wireless tag along a conveyance path;

acquiring a first plurality of strengths of radio signals received from the first wireless tag during the conveyance of the first sheet;

acquiring a second plurality of strengths of radio signals received from wireless tags of sheets not being conveyed during the conveyance of the first sheet;

determining a threshold value for distinguishing a wireless tag of a sheet being conveyed along the conveyance path from wireless tags of sheets not being conveyed along the conveyance path based on the first plurality of strengths and the second plurality of strengths; and conveying a second sheet with a second wireless tag and writing information to the second wireless tag when a strength of a radio signal received from the second wireless tag is greater than or equal to the threshold value.

12. The method according to claim 11, wherein the threshold value is greater than each of the second plurality of strengths.

13. The method according to claim 11, further comprising:

after completion of the conveyance of the first sheet, conveying a third sheet with a third wireless tag, and acquiring a third plurality of strengths of radio signals received from the third wireless tag during the conveyance of the third sheet, wherein the threshold value is determined further based on the third plurality of strengths.

14. The method according to claim 11, wherein the sheets not being conveyed are stored in a paper storage cassette.

15. The method according to claim 11, wherein the sheets not being conveyed are stored in a manual sheet feed tray.

16. The method according to claim 11, wherein the sheets not being conveyed are stored in a plurality of paper storage cassettes.

17. The method according to claim 11, wherein received signal strength indicators (RSSIs) are acquired as the first plurality of strengths and the second plurality of strengths.

18. The method according to claim 11, wherein a wireless tag of each sheet is a radio frequency identification (RFID) tag.

19. The method according to claim 11, further comprising:

forming an image on the conveyed second sheet.

20. The method according to claim 19, wherein the sheet processing apparatus is an image forming apparatus.

* * * * *